Jan. 12, 1965
W. ELLIOTT ETAL
3,165,108
APPARATUS FOR AUTOMATICALLY TRANSFERRING AN ARTICLE FROM
A SERIES OF BATHS OR THE LIKE IN WHICH IT IS IMMERSED
FOR PREDETERMINED PERIODS OF TIME
Filed Nov. 8, 1963
3 Sheets-Sheet 1
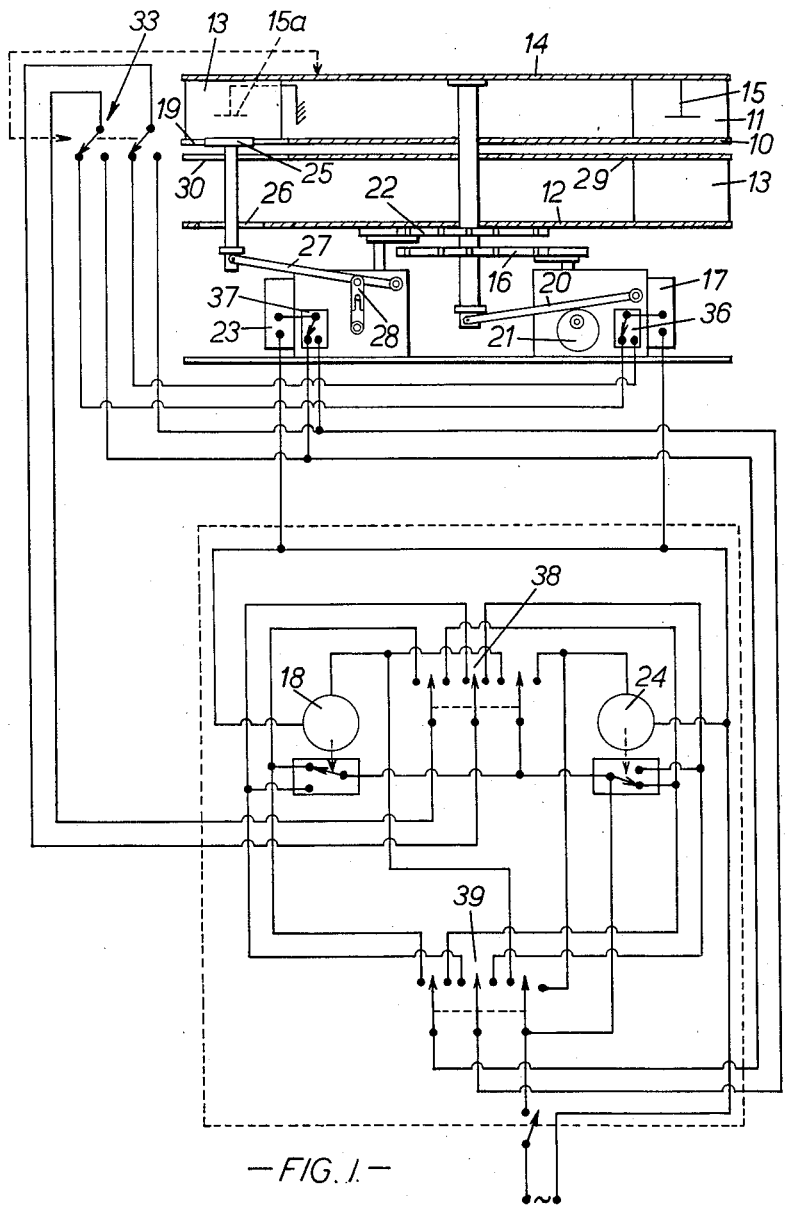
— FIG. 1. —
INVENTORS
WILLIAM ELLIOTT
FRANCIS T. HOWELLS
BY
ATTYS.

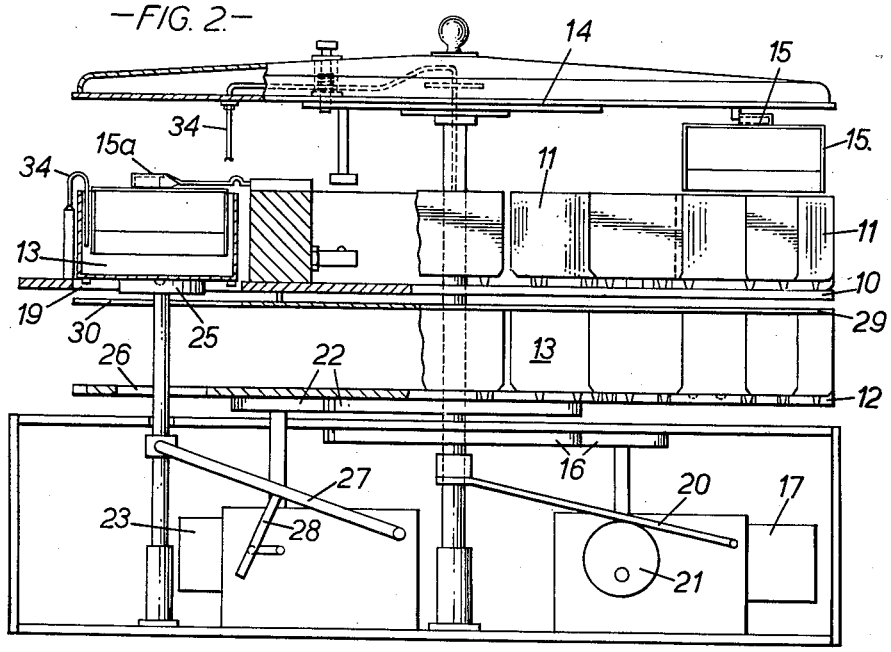
-FIG. 2.-
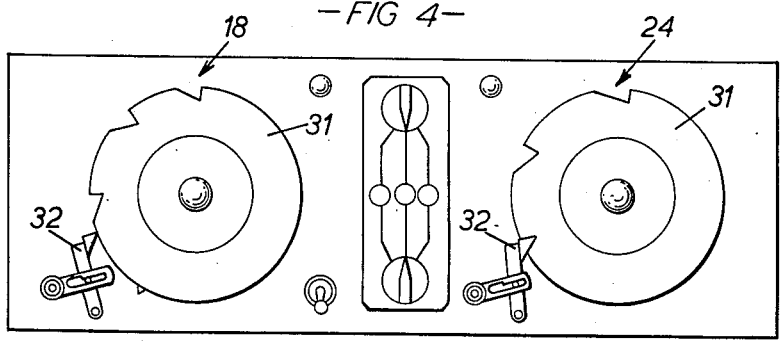
-FIG 4-
INVENTORS
WILLIAM ELLIOTT
FRANCIS T. HOWELLS Jan. 12, 1965  W. ELLIOTT ETAL  3,165,108
APPARATUS FOR AUTOMATICALLY TRANSFERRING AN ARTICLE FROM
A SERIES OF BATHS OR THE LIKE IN WHICH IT IS IMMERSED
FOR PREDETERMINED PERIODS OF TIME
Filed Nov. 8, 1963  3 Sheets-Sheet 3
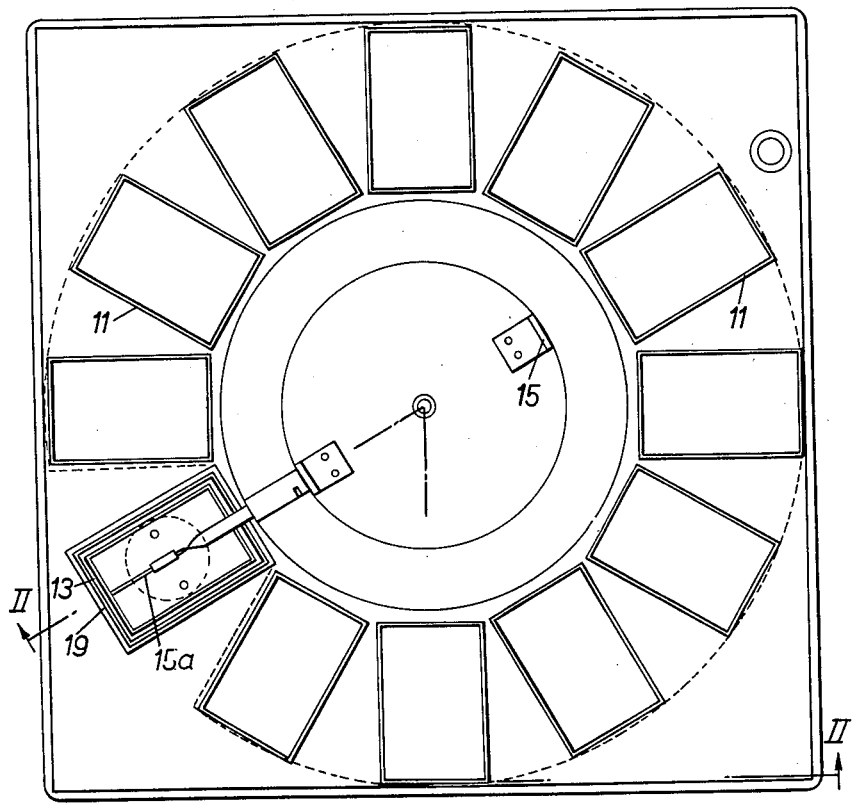
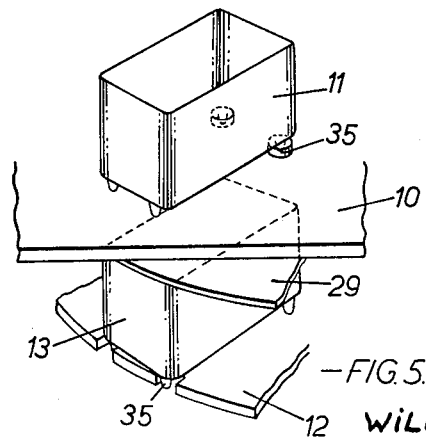
INVENTORS
WILLIAM ELLIOTT
FRANCIS T. HOWELLS
BY
*Imirie & Smiley*
ATTYS.

United States Patent Office 3,165,108
Patented Jan. 12, 1965

3,165,108
APPARATUS FOR AUTOMATICALLY TRANSFERRING AN ARTICLE FROM A SERIES OF BATHS OR THE LIKE IN WHICH IT IS IMMERSED FOR PREDETERMINED PERIODS OF TIME
William Elliott, Prestatyn, North Wales, and Francis Thomas Howells, Hoylake, Wirral, England, assignors to Elliotts Liverpool Limited, Liverpool, England, a British company
Filed Nov. 8, 1963, Ser. No. 322,487
Claims priority, application Great Britain, Dec. 11, 1962, 46,698/62
8 Claims. (Cl. 134—58)

This invention is for improvements in or relating to apparatus for automatically transfering an article from a series of baths or the like in which it is immersed for predetermined periods of time.

The invention is particularly, although not exclusively, concerned with apparatus for use in pathology for which purpose the article to be transferred from one bath to another after a predetermined period of immersion may be a slide, film or cover slip carrying, for example, a blood or marrow 'smear" or "spread," or it may be a piece of animal tissue, the baths containing appropriate stains or reagents.

For certain pathological diagnosis an apparatus is required comprising a relatively large number of baths. Heretofore, however, machines, if they incorporate such a large number of baths, have been objectionably bulky. An object of the present invention is to provide an apparatus which, although of particularly compact construction, does embody a relatively large number of baths.

According to the present invention there is provided an apparatus for automatically traversing an article through a series of baths, containers, troughs or the like in which it is immersed for predetermined periods of time, wherein the baths or the like are arranged in two or more tiers, a movable article holder being presented in turn to the baths in one tier and the baths in another tier being movable for presentation in turn to a relatively stationary article holder.

According to a further feature of the present invention there is provided an apparatus for automatically transferring an article from a series of baths, troughs or the like in which it is immersed for predetermined periods of time, comprising an article holder, a first tier of baths, means for moving the article holder from bath to bath after predetermined time intervals, a second tier of containers or baths and means for presenting the containers or baths of the second tier to an article holder in turn after predetermined time intervals. There may be one article holder for both tiers of baths or separate article holders.

As an example, there may be eleven baths or containers in the upper tier and twelve in the lower tier and the article holder may be stepped round so that first the article is immersed for the required periods of time in each of the eleven baths of the upper tier. When the article holder comes to a blank or twelfth position in the upper tier it remains stationary and then the lower tier of baths or containers is stepped round and at each step the bath or container in said lower tier, which has been positioned under the article holder, is raised, so that an article on said holder is immersed in said bath for the required period of time. Thus, there may, with the arrangement just described, be as many as twenty three different baths or containers and yet the overall diameter of the circle of baths or containers is not greater than that of a machine as available heretofore having only twelve baths. Put another way, the lower tier constitutes a "store" in which baths may be kept pending their use in the upper tier position. The upper and lower tiers may be used separately or conjointly.

In one preferred embodiment of the invention, using an arrangement as just described, two separate motors are provided, one for the upper tier and one for the lower tier. These motors are controlled by a time switch so that an article carried by the article holder is immersed for the required period and then moved on to the next bath. When the article holder has completed its traverse of the upper baths or containers its descent into the vacant space of said tier automatically cuts out one motor and brings into operation the motor associated with the second or lower tier. This tier is then stepped round at appropriate times in accordance with the time switch, a bath or contanier being held raised, so that an article carried by the article holder is immersed in it, in the intervals between rotation of the baths.

One particular embodiment of the invention will now be described, by way of example, with reference to the accompanying drawings in which:

FIGURE 1 is a diagrammatic view,
FIGURE 2 is an elevation, partly in section on the line II—II of FIGURE 3, of the actual apparatus,
FIGURE 3 is a section plan view of FIGURE 2, and
FIGURES 4 and 5 are views of details.

This embodiment, which in some respects is similar to the tissue processing apparatus forming the subject matter of our British Patent No. 702,994 comprises an upper stationary table 10 adapted to support an upper tier of baths or troughs 11, arranged in circular formation, and a lower rotatable table 12 adapted to support a lower tier of baths or troughs 13 concentric with the upper tier.

Mounted on an axis at the centre of the rings of baths is a disc or cover 14, the periphery of which projects over the circle of baths of the upper tier and carries a holder 15 for slides, specimens or the like to be processed. This disc is adapted to be stepped around by means of a Geneva mechanism 16 and is also adapted to be raised and lowered so as to withdraw the slide carrier 15 from, or immerse it in one of the baths 11. These movements of the disc are effected by an electric motor 17 under the control of electric time switches 18 or 24. One or the other of these time switches is selected, as hereinafter described, according to the length of the time cycle required. When the disc 14 is in its lowermost position the baths are covered and evaporation and contamination of the contents thereof is avoided.

In this particular embodiment the upper table 10 has twelve cup positions but for the purpose of the present invention one of these is left vacant and is occupied by a gap or hole 19 in the table for a purpose hereinafter to be described. The cup shown as occupying a position above the gap 19 in FIGURES 1 and 2 is a cup from the lower tier, not a cup of the upper tier as will be explained more fully hereafter.

The raising and lowering of the disc 14 which carries the slide holder 15 may be effected from the motor 17 by a forked arm or lever 20 adapted to be raised and lowered by means of a crank, cam or like mechanism 21.

The lower rotatable table 12 which is adapted to carry the lower tier of baths 13, of which there are twelve, is stepped round by means of a Geneva mechanism 22 driven by a further electric motor 23 adapted to be controlled by the time switch 18 or 24. This motor also actuates, under the control of one or the other of said time switches, a mushroom-like bath elevator or lift 25 positioned for vertical movement under the lower table and in axial alignment with the aforementioned gap or hole 19 in the upper table 10. Here again the time switch selected depends on the length of the time cycle required.

Each of the baths 13 of the lower tier is positioned over an opening 26 in the lower table, which supports said baths, the head of the aforementioned elevator 25 being adapted to pass through said openings.

Raising and lowering of the elevator 25 may be effected from the motor 23 through a forked arm or lever 27 adapted to be oscillated in a vertical plane by means of a crank, cam or like mechanism 28.

A further and non-rotatable cover plate 29 is provided which is adapted to cover all the baths of the lower tier with the exception of that in which the slide carrier is, for the time being, immersed and which is in register with a gap or opening 30 in said cover plate.

Each of the time switches 18, 24 comprises a clock mechanism to which is attached a metal or other disc 31 (see FIGURE 4) having notches cut into its periphery at the desired changeover times. As each notch comes into position opposite a timing lever 32, the lever enters the notch and in so doing actuates the changeover mechanism for transferring the slides from one staining trough or bath to the next. It will be appreciated that the notches are cut in the timing disc according to the staining programme decided upon by the pathologist or technician. Such timing mechanisms are well known and are not, therefore, described in greater detail.

Connection of one or the other or both time switches in circuit is effected by selector switches 38 and 39. In FIGURE 1 these selector switches are both in the OFF position.

Presuming that the apparatus is required to operate in series, i.e. the slide or tissue is traversed first through the upper tier of baths and then through the lower tier. The selector switch 38 is turned to the left where it is desired to select the time switch 18 and to the right if it is desired to select the time switch 24. The selector switch 39 remains in the OFF position. The slide holder 15 with the slide or slides or the like thereon is then immersed in the first bath 11 of the upper tier.

After the slide or slides in the slide holder 15 have remained in the first bath of the upper tier for the period determined by the time switch 18 or 24, whichever has been selected, said switch operates and switches on the motor 17 associated with the upper tier of baths so that the disc 14 and thereby the slide carrier 15 is raised, turned angularly so as to lie over the second bath 11, and then lowered, so as to bring the slides into that bath. The slide then remains in the second bath for the predetermined period after which it is similarly transferred to the third bath 11 and so on through the eleven baths of the upper tier.

When the slide holder 15 leaves the eleventh bath and moves to the vacant twelfth position in the upper tier, occupied by the gap 19, the disc 14, during its descent, operates a changeover switch 33 which, through contactors 36 and 37, terminates the upper tier cycle, whilst the slide holder 15 and slide are in the lowered position and starts the motor 23. The first bath of the lower tier is then raised to the position shown in FIGURES 1 and 2, so that the slide carrier and slide become immersed therein, the motor 23 then stops.

After the predetermined time of immersion in the first bath of the lower tier the motor 23 is again brought into operation by the time switch 18 or 24, whichever has been selected by the switch 38, so that the first bath, which is resting on the aforementioned lift or elevator 25, is lowered clear of the slide and onto the rotatable table 12, the table 12 and lower tier of baths 13 are rotated so as to bring the second bath of that tier immediately under the slide holder 15 and that bath is then raised, by the elevator 25, through the gap 19, so that the slide is immersed therein. This procedure continues after the predetermined time intervals throughout the twelve baths of the lower tier. If desired, the first bath of the lower or "storage" tier may be in the position shown in FIGURES 1 and 2 throughout the upper tier cycle, the lower tier cycle starting with the lowering of said first bath by the motor 17.

It will be appreciated from the above description that the slides may be immersed in as many as twenty-three different baths or troughs. On reaching the final position a bell rings to warn the technician that the staining cycle has been completed. Normally the slides are then removed or the machine is switched off. If, however, the machine is left on, a safety device, operated by a projection on the edge of the timing discs, prevents the slide carrier from commencing on a further staining cycle.

Means may be provided for agitating the slides in the bath, e.g. by oscillating the slide carrier vertically or angularly or rotating it during its period of immersion. Preferably, however, such agitation is effected by gently aerating the liquid in the bath in which the slides happen to be immersed. This may be effected by an apparatus, similar to that used for aerating an aquarium, and indicated at 34 in FIGURE 2. Alternatively a pulsating pumping device may be provided which ultimately withdraws from and discharges back into the bath a small amount of the fluid therein.

The baths and the tables on which they are positioned may be provided with spigot-and-socket or like interfitting parts, as indicated at 35 in FIGURE 5, so as to avoid dislodgment of the baths and to ensure that they are maintained in their correct positions in relation to the slide holder.

It will be appreciated that, as described above, the apparatus operates in series, i.e. the slide or tissue holder moves into and out of the twenty-three baths in turn, first one motor and then the other being brought into operation under the control of one or other of the timing units 18 or 24.

The selector switches 38 and 39 provide, however, for switching over to parallel operation of the two tiers of baths. For parallel operation both selector switches are turned either to the right if the time switch 24 is to be used or to the left if the time switch 18 is to be used. It is arranged that the time switch selected will mechanically or electrically render operation of the switch 33 by the cover disc 14 ineffective. The two motors 17 and 23 then operate at the same time so that one programme may be carried out on the upper tier and an identical programme on the lower tier, thus enabling the one machine in effect to do the work of two similar machines of eleven-bath and twelve-bath capacity. It will be appreciated that when the machine is to be operated in this way a further and stationary slide or tissue holder 15a is provided for holding the slides or tissues which are to be immersed in the baths of the lower tier. This further tissue holder or slide carrier can be mounted on any convenient stationary part of the apparatus so that it lies over the elevator 25 and in the path of circular movement of the lower tier of baths.

The apparatus can also be arranged so that both tiers can be operated independently, i.e. in effect as two separate machines. For this mode of operation one selector switch, 38 or 39, is turned to the left and the other to the right so that the cycle through one tier of baths is controlled by the time switch 18 and through the other by the time switch 24. As in parallel operation, mechanized or electrical arrangements in the time switch controlling the upper tier prevent the cover disc 14 operating effectively the switch 33. Here again, the slide or tissue holder 15a serves for the lower tier of baths.

The system may be arranged to provide automatic charging and discharging of the slides during a complete cycle, particularly where the slides only have to be immersed in a small number of baths. In this case one or other tier may be used as a loading and storage station.

There may be more than two tiers of baths arranged to operate in series or in parallel or independently.

We claim:

1. Automatic immersion apparatus comprising at least two series of baths in tier formation one series above the other, article-holding means for holding an article to be immersed in said baths, means for moving and raising and lowering said article-holding means so that an article thereon is presented in turn to the baths of one series and immersed therein, means for moving and raising and lowering the baths of the other series to present them in turn to an article on the article-holding means so that said article is immersed therein, motor means for driving both said moving and raising and lowering means, and time switch mechansm controlling the operaton of said motor means whereby an article on the article-holding means is immersed in each bath for a predetermined period.

2. Automatic immersion apparatus comprising at least two series of baths in tier formation one series above the other, the upper series having a blank space, article-holding means for holding an article to be immersed in said baths, means for moving and raising and lowering said article-holding means so that an article on it is presented in turn to the baths of the upper series and immersed therein and finally brought to the blank space in said upper series, means for moving and raising and lowering the baths of the lower series to present them in turn to the article on the article-holding means stationed at said blank space so that said article is immersed in turn in the baths of the lower series, motor means for driving both said moving, lowering and raising means and time switch mechanism controlling the operation of said motor means whereby an article on the article-holding means is immersed in each bath for a predetermined period.

3. Automatic immersion apparatus comprising at least two series of baths in tier formation one series above the other the upper series having a blank space, article-holding means for holding an article to be immersed in said baths, means for moving and raising and lowering said article-holding means so that an article on said article-holding means is moved from bath to bath of the upper series and immersed in each bath, means for halting movement of said article-holding means when it arrives at the blank space in the upper series of baths, means for moving each bath of the lower series in turn to a position immediately below the blank space in the upper series and raising and lowering it so that an article on the article-holding means positioned in the blank space of the upper series is immersed in the raised bath, motor means for driving said article-holder moving and raising and lowering means and said bath moving and raising and lowering means and switch means including time switch mechanism controlling said motor means so that an article on the article-holding means is immersed in each bath of the upper and lower series for a predetermined time.

4. Automatic immersion apparatus comprising at least two series of baths in tier formation one series above the other the upper series having a blank space, article-holding means for holding an article to be immersed in said baths, means for moving and raising and lowering said article-holding means so that an article on said article-holding means is moved from bath to bath of the upper series and immersed in each bath, means for halting movement of said article-holding means when it arrives at the blank space in the upper series of baths, means for moving each bath of the lower series in turn to a position immediately below the blank space in the upper series and raising and lowering it so that an article on the article-holding means, positioned in the blank space of the upper series, is immersed in the raised bath, motor means for driving said article-holder moving and raising and lowering means and said bath moving and raising and lowering means, switch means including time switch mechanism controlling said motor means so that an article on the article-holding means may be immersed first in each bath of the upper series and then in each bath of the lower series for a predetermined time, a further stationary article-holding means and further switch means whereby the series immersion of an article on the first-mentioned article-holding means in the baths of both the upper and lower series can be cancelled and an article on said first-mentioned article-holding means immersed only in the baths of the upper series and an article on said further article-holding means immersed in the baths of the lower series.

5. Automatic immersion apparatus as claimed in claim 1 and having at least two time switch mechanisms for controlling the immersion periods in the baths and change-over switch means whereby one or other of said time switch mechanisms may be selected for operation according to the length of the time cycle required.

6. Automatic immersion apparatus as claimed in claim 1 and having means for agitating liquid in the baths comprising a pulsating pumping device which alternately withdraws from and discharges back into the baths a small amount of the liquid therein.

7. Automatic immersion apparatus comprising at least two circular series of baths in tier formation one series above the other the upper series having a blank space, article-holding means for holding an article to be immersed in said baths, means for moving said article-holding means angularly step-by-step and for raising and lowering it so that an article on said article-holding means is moved from bath to bath of the upper series and immersed in each bath, means for halting movement of said article-holding means when it arrives at the blank space in the upper series of baths, a step-by-step rotatable table supporting the lower series of baths said table having openings over which the baths are positioned, means for rotating said table step-by-step to bring the baths of the lower series in turn to a position immediately below the blank space in the upper series, means movable through said openings in the table for raising and lowering a bath from the lower series so that an article on the article-holding means, positioned in the blank space of the upper series, is immersed in the raised bath, motor means for driving said article-holder moving, raising and lowering means and said table and bath raising and lowering means and switch means including time switch mechanism controlling said motor means so that an article on the article-holding means is immersed in each bath of the upper and lower series for a predetermined time.

8. Automatic immersion apparatus as claimed in claim 7 and further comprising cover means for the baths.

References Cited by the Examiner
UNITED STATES PATENTS

| | | | |
|---|---|---|---|
| 2,583,379 | 1/52 | Kling | 118—425 X |
| 2,741,221 | 4/56 | Weiskopf | 134—77 X |
| 2,869,508 | 1/59 | Pelavin | 134—77 X |

FOREIGN PATENTS

| | | |
|---|---|---|
| 702,994 | 1/54 | Great Britain. |

CHARLES A. WILLMUTH, *Primary Examiner.*
GEORGE J. NORTH, *Examiner.*